United States Patent
Takahashi

(10) Patent No.: US 9,723,193 B2
(45) Date of Patent: Aug. 1, 2017

(54) TRANSMITTING DEVICE, RECEIVING SYSTEM, COMMUNICATION SYSTEM, TRANSMISSION METHOD, RECEPTION METHOD, AND PROGRAM

(75) Inventor: Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 13/493,306

(22) Filed: Jun. 11, 2012

(65) Prior Publication Data

US 2013/0021530 A1 Jan. 24, 2013

(30) Foreign Application Priority Data

Jul. 20, 2011 (JP) ................................ 2011-159120

(51) Int. Cl.
- H04N 7/26 (2006.01)
- H04N 5/268 (2006.01)
- H04N 7/14 (2006.01)
- H04N 7/12 (2006.01)
- H04N 5/232 (2006.01)
- H04N 5/247 (2006.01)

(52) U.S. Cl.
CPC ......... H04N 5/23206 (2013.01); H04N 5/247 (2013.01)

(58) Field of Classification Search
CPC ..... H04N 5/23206; H04N 5/247; H04N 5/268
USPC ........................ 375/240.01, 240.12; 709/224
See application file for complete search history.

(56) References Cited

U.S. PATENT DOCUMENTS

2003/0185301 A1* 10/2003 Abrams et al. .......... 375/240.12
2003/0197785 A1* 10/2003 White et al. ............. 348/207.99
2011/0161485 A1* 6/2011 George et al. ................ 709/224

FOREIGN PATENT DOCUMENTS

JP 9-238277 9/1997

OTHER PUBLICATIONS

U.S. Appl. No. 13/592,778, filed Aug. 23, 2012, Takahashi.
Office Action for CN Patent Application No. 201210246269.9, issued on Sep. 5, 2016, 09 pages of Office Action and 09 pages of English translation.

* cited by examiner

*Primary Examiner* — Hee-Yong Kim
(74) *Attorney, Agent, or Firm* — Chip Law Group

(57) ABSTRACT

There is provided a transmitting device including a packet signal generation unit configured to generate a packet signal of a video, a transmitting unit configured to transmit the packet signal via an asynchronous transmission network used in common by another transmitting device, and a compression rate control unit configured to control a video compression rate. Switch timing information indicating a switch timing of the video compression rate is transmitted together with the packet signal of the video.

21 Claims, 9 Drawing Sheets

TRANSMITTING DEVICE, RECEIVING SYSTEM, COMMUNICATION SYSTEM, TRANSMISSION METHOD, RECEPTION METHOD, AND PROGRAM

BACKGROUND

The present disclosure relates to a transmitting device, a receiving system, a communication system, a transmission method, a reception method, and a program.

A system having a plurality of cameras and a camera control unit (CCU) is known as disclosed in JP H09-238277A, for example.

SUMMARY

By the way, when video signals sent from a plurality of cameras are transmitted via a packet transmission network such as Ethernet, if the video signals of the plurality of cameras are collectively transmitted to an image receiver through a single cable via a switch called a network switch, the system configuration can be simplified.

However, the volume of data that can be transmitted through a single Ethernet cable is limited. Thus, when videos from a number of cameras are transmitted, if the video quality of all cameras is set high, a circumstance would arise that all videos would not be able to be transmitted.

Therefore, it is considered that if the video quality of only a main camera is set higher than the video quality of the other cameras, the data transmission volume as a whole can be suppressed. However, in such a case, when the main camera is switched to another camera, the image quality would change, providing a sense of discomfort to a viewer.

In view of the foregoing, it is desirable to, in a system that collectively sends video signals of a plurality of cameras to an image receiver, transmit a video of a main camera in high quality and, when the main camera is switched to another camera, switch the video without producing a sense of discomfort.

According to an embodiment of the present disclosure, there is provided a transmitting device including a packet signal generation unit configured to generate a packet signal of a video, a transmitting unit configured to transmit the packet signal via an asynchronous transmission network used in common by another transmitting device, and a compression rate control unit configured to control a video compression rate. Switch timing information indicating a switch timing of the video compression rate is transmitted together with the packet signal of the video.

According to another embodiment of the present disclosure, there is provided a receiving system including a receiving unit configured to receive packet signals of videos from a plurality of cameras via an asynchronous transmission network, a switch timing acquisition unit configured to acquire switch timing information of a video compression rate included in each packet signal, and a switch control unit configured to switch between the videos of the plurality of cameras in accordance with the switch timing information.

According to still another embodiment of the present disclosure, there is provided a communication system including a plurality of transmitting devices and a receiving system. Each transmitting device includes a packet signal generation unit configured to generate a packet signal of a video, a transmitting unit configured to transmit the packet signal via an asynchronous transmission network used in common by another transmitting device, and a compression rate control unit configured to control a video compression rate. Switch timing information indicating a switch timing of the video compression rate is transmitted together with the packet signal of the video. The receiving system includes a receiving unit configured to receive packet signals of videos from the plurality of transmitting devices via the asynchronous transmission network, a switch timing acquisition unit configured to acquire the switch timing information included in each packet signal, and a switch control unit configured to switch between the videos of the plurality of transmitting devices in accordance with the switch timing information.

According to further another embodiment of the present disclosure, there is provided a receiving system including a receiving unit configured to receive packet signals of videos from a plurality of cameras via an asynchronous transmission network, a control signal transmitting unit configured to transmit a control signal for a video compression rate, a switch timing computing unit configured to compute a switch timing of the video compression rate based on a predetermined parameter including at least a delay time of the asynchronous transmission network, and a switch control unit configured to switch between the videos of the plurality of cameras based on the switch timing.

According to the embodiments of the present disclosure described above, it is possible to, in a system that collectively sends video signals of a plurality of cameras to an image receiver, transmit a video of a main camera in high quality and, when the main camera is switched to another camera, switch the video without producing a sense of discomfort.

DETAILED DESCRIPTION OF THE EMBODIMENTS

Figure 1:
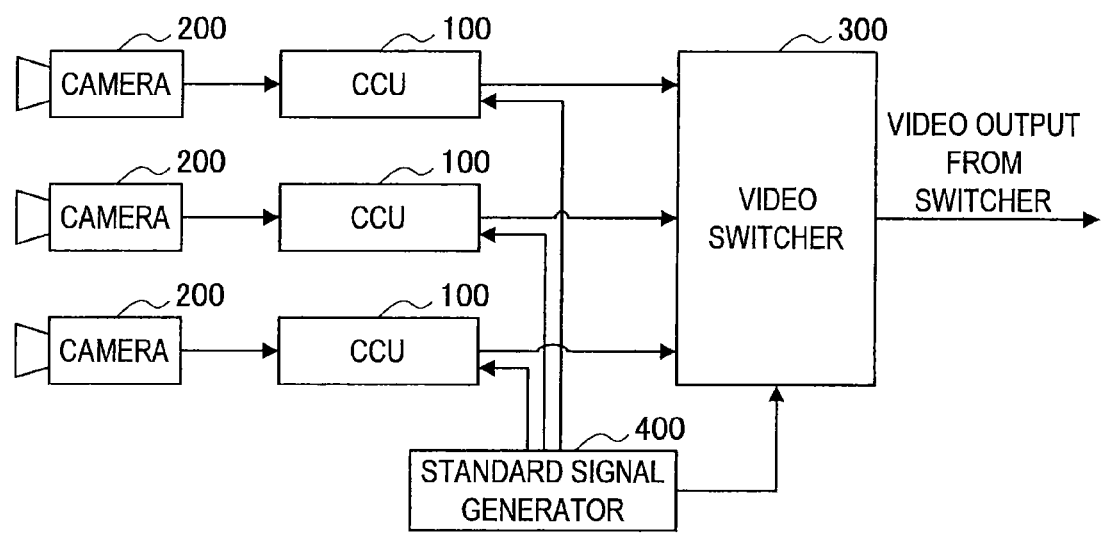
FIG. 1 is a block diagram of a camera control system that uses a camera control device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. First Embodiment
1-1. Base Technology
1-2. Summary of this Embodiment
1-3. Process Flow of this Embodiment
2. Second Embodiment 1. First Embodiment 1-1. Base Technology First, a base technology of the present disclosure will be described. FIG. 1 is a block diagram of a camera control system that uses a camera control device. This camera system is used in a studio such as a TV station, for example, and includes, as a camera control device, a plurality of CCUs (camera control units) 100, a plurality of cameras (CHUs (Camera Head Units)) 200 connected to the respective CCUs 100 via camera cables, a video switcher 300 that transmits and receives signals such as video signals or return video signals to/from the CCUs 100, and a standard signal generator 400 that outputs a standard signal serving as a reference for achieving video synchronization between the CHUs 200 and the CCUs 100. Each camera 200 includes a camera unit 200A including imaging optics and an image sensor (e.g., a CCD or a CMOS sensor), and a transmitter 200B that transmits video data acquired with the image sensor.

In FIG. 1, each CCU 100 should receive from the camera (CHU) 200 a video signal synchronized with a reference signal from the standard signal generator 400. Herein, the CCU 100 transmits a reference signal from the standard signal generator 400 to the camera 200, and the camera 200 transmits a video signal synchronized with the reference signal to the CCU 100. However, actually, due to transmission delays in the camera cables between the cameras 200 and the CCUs 100, processing delays in the CCUs 100, and the like, video signals that arrive at the video switcher 300 have errors in timing. Thus, the cameras 200 perform fine adjustment of the transmission timings of video signals so that the input timings of video signals from the CCUs 100 to the video switcher 300 are synchronized. Accordingly, it is possible to ensure the identicalness of the input timings of video signals from the CHUs 200 to the video switcher 300.

A function of the video switcher 300 is to instantaneously switch a video by switching between inputs from the plurality of cameras 100 through an operation using a switch button, or the like. Other functions of the video switcher 300 are to, when switching a video, performing a wiping process, a striping process, a two-screen combining process, and the like.

As described above, each camera 200 performs fine adjustment of the transmission timing of a video signal. Therefore, the input timings of video signals from the cameras 200 to the video switcher 300, namely, frame phase timings are adjusted so that they are completely synchronized. When such adjustment is applied, it becomes possible to, when the video switcher 300 switches a camera, smoothly switch a video of the camera 200 without corruption of videos between adjacent frames.

Figure 2:
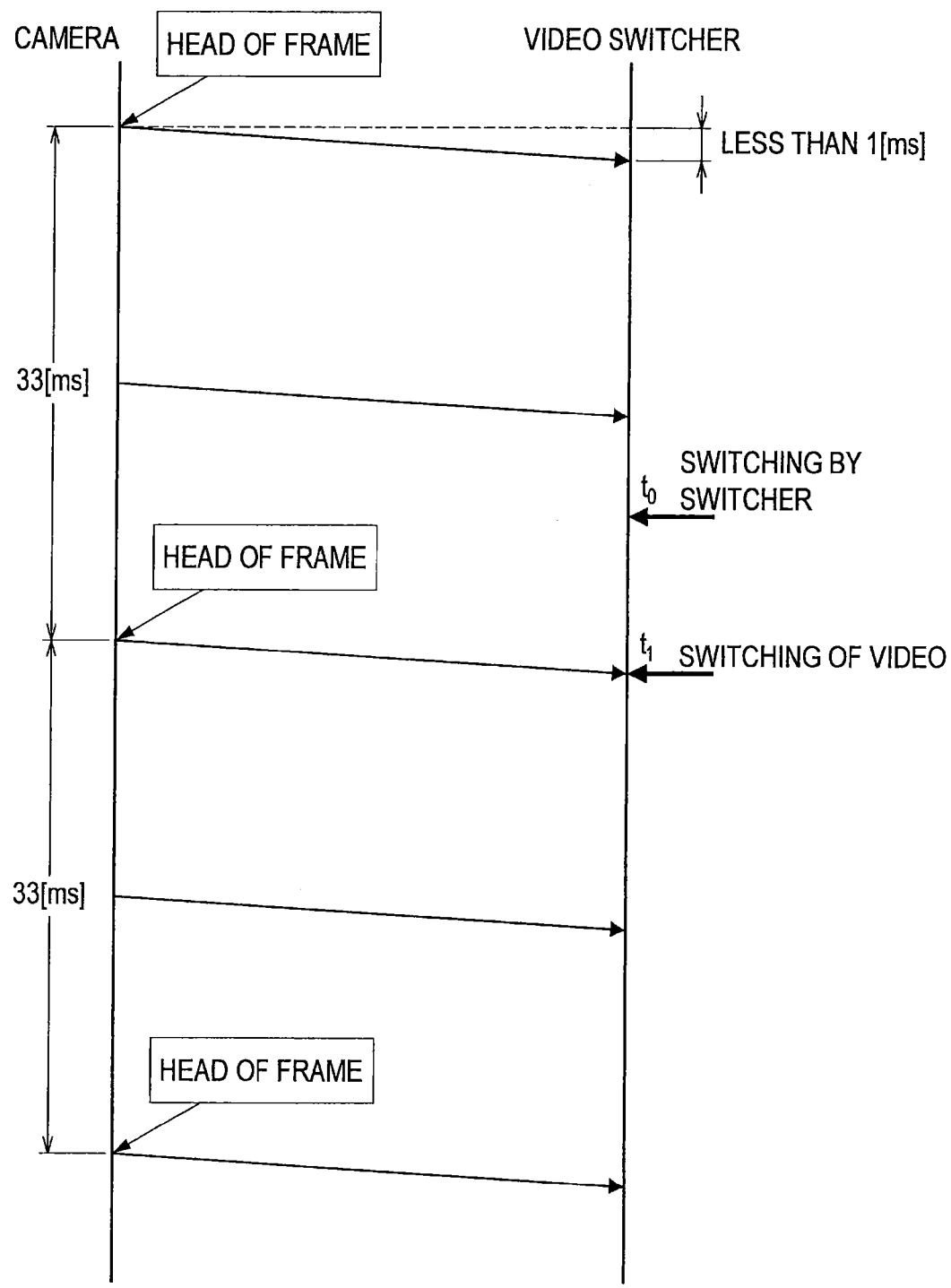
FIG. 2 is a schematic diagram showing a sequence in which a video of a camera is switched with a video switcher.

FIG. 2 is a schematic diagram showing a sequence in which a video of the cameras 200 is switched with the video switcher 300. Typically, the transmission distance from each camera 200 to the video switcher 300 is relatively not long, and no time is taken for image compression/decompression. Therefore, as shown in FIG. 2, a delay time at a point in time when a head of a frame of a video output from the camera 200 arrives at the video switcher 300 is estimated to be less than 1 ms. Herein, an interval of a frame of a video is assumed to be about 33 ms, namely, 60 fps (frames/second). When an operation of switching the camera 200 is performed at time t0 through a switching operation on the video switcher 300, the actual video will switch at a head of a first frame received after the switching operation (time t1). Suppose a case in which switching is performed immediately after a head of a frame arrives at the video switcher 300, the maximum delay time necessary for the switching will be 33 ms.

By the way, in a camera system for live videos such as the one shown in FIG. 1 (a camera system for live production), it is also presumed that images are compressed and videos are subjected to synchronous transmission using general, inexpensive Ethernet. When Ethernet is used, the transmission distance can be set to about several ten km to 200 km, or longer than that. If the transmission distance is 200 km, the transmission delay will be about 10 ms.

Figure 3:
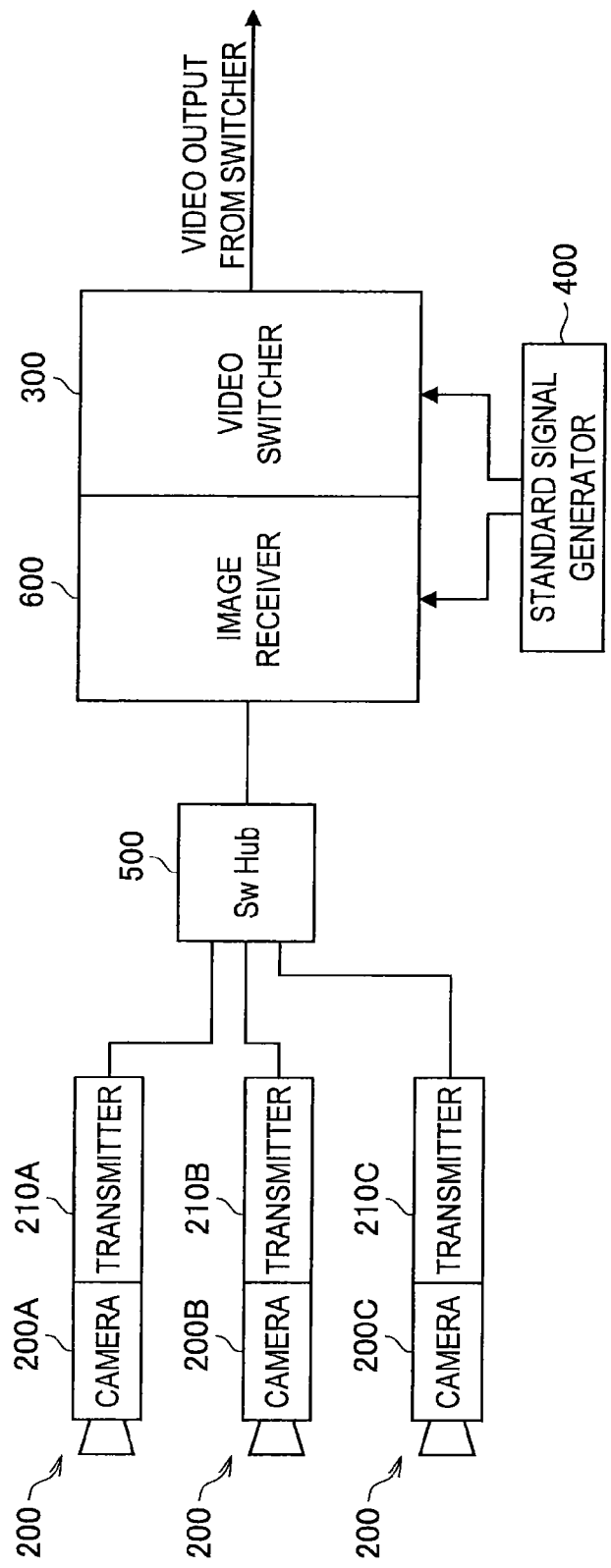
FIG. 3 is a schematic diagram showing a system configuration when Ethernet is used.

FIG. 3 is a schematic diagram showing a system configuration when Ethernet is used. When Ethernet is used, a plurality of cameras 200A, 200B, and 200C can be connected to a single image receiver (a camera receiver) 600 via a network switch 500. The cameras 200A, 200B, and 200C are provided with transmitters 210A, 210B, and 210C, respectively, for transmitting video signals to the Ethernet.

As described above, in the system shown in FIG. 3, unlike a 1:1 (point-to-point) connection such as the one shown in FIG. 1, a star connection that uses Ethernet or the like, namely, a connection that uses the network switch 500 (indicated by a switching hub (Sw hub) in FIG. 3) is used. Accordingly, videos of the plurality of cameras 200A, 200B, and 200C can be collectively transmitted to a single image receiver 600 through a single Ethernet cable.

Herein, it is assumed that Gigabit Ethernet is used as a network, and the volume of data that can be transmitted through a single Ethernet cable is 1 Gbps at maximum. As the volume of data that can be transmitted between the network switch 500 and the image receiver 600 is 1 Gbps, if the transmission rate of each of the cameras 200A, 200B, and 200C is set to 440 Mbps, as the videos of three cameras are transmitted between the network switch 500 and the image receiver 600 (440 Mbps×3=1320 Mbps), it is difficult to transmit all data.

Thus, it is presumed that the transmission rate of the main camera 200 selected by the video switcher 300 is set to 440 Mbps, and the transmission rates of the other cameras are lowered to 110 Mbps. Accordingly, 440 Mbps+110 Mbps× 2=660 Mbps results, whereby videos of the three cameras can be sufficiently transmitted through a 1 Gbps transmission channel. Note that shown herein is an example in which a video of the main camera 200 with a transmission rate of 440 Mbps is used as a video for actual broadcast, and videos of the other cameras 200 with a transmission rate of 110 Mbps are used for monitoring.

Figure 4:
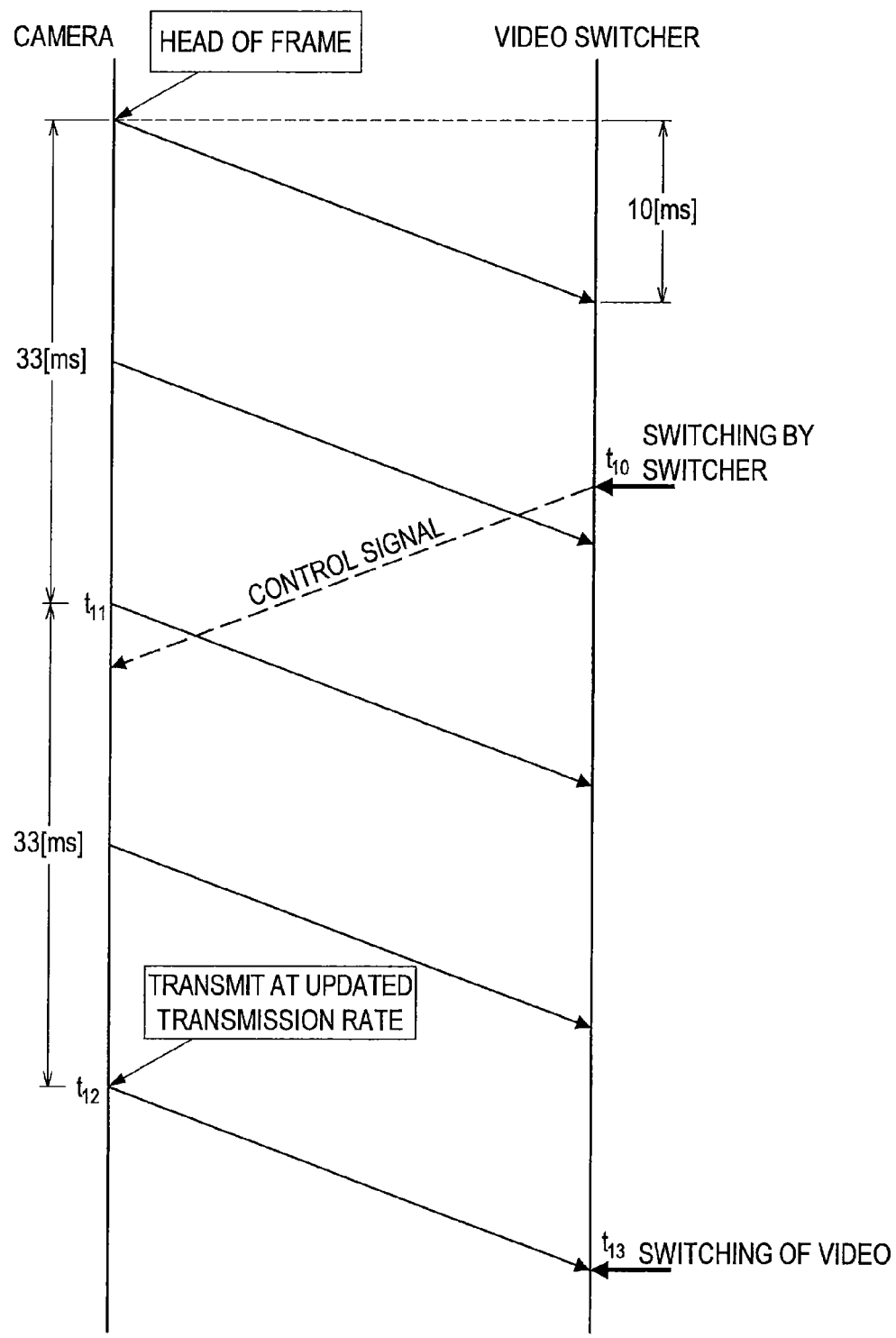
FIG. 4 is a schematic diagram showing a sequence in which the transmission delay is 10 ms, for example, in the system shown in FIG. 3.

FIG. 4 is a schematic diagram showing a sequence in which the transmission delay is 10 ms, for example, in the system shown in FIG. 3. When an operation of switching the camera 200 is performed with the video switcher 300, the system in FIG. 1 has only to switch a video signal using only the video switcher 300, while the system in FIG. 3 transmits a transmission rate control signal to the camera 200 side to change the transmission rate in accordance with the switching of the camera.

In the example of FIG. 4, a transmission delay of 10 ms is generated from the time when the video switcher 300 instructs video switching to be performed till its control signal arrives at the camera 200 side. Therefore, in the example of FIG. 4, after the video switch timing (time t10) of the video switcher 300, the control signal does not arrive at the camera 200 side yet at the position of a head of a next frame (time t11). Thus, the transmission rate cannot be updated. Therefore, the transmission rate is updated at the position of a head of one more next frame (time t12), and a video with the updated transmission rate arrives at the video switcher 300 at time t13. Thus, the video switcher 300 can switch a video after actually receiving a video with the updated transmission rate based on the control signal at the time t13.

As described above, the video switcher 300 should switch an image at the actual switch timing of the transmission rate. However, delays of the cameras 200 connected to the video switcher 300 are not uniform. Therefore, the actual switch timing of the transmission rate varies from camera 200 to camera 200, such as one frame or two frames later than that indicated by a switching instruction issued by the video switcher 300.

Figure 5:
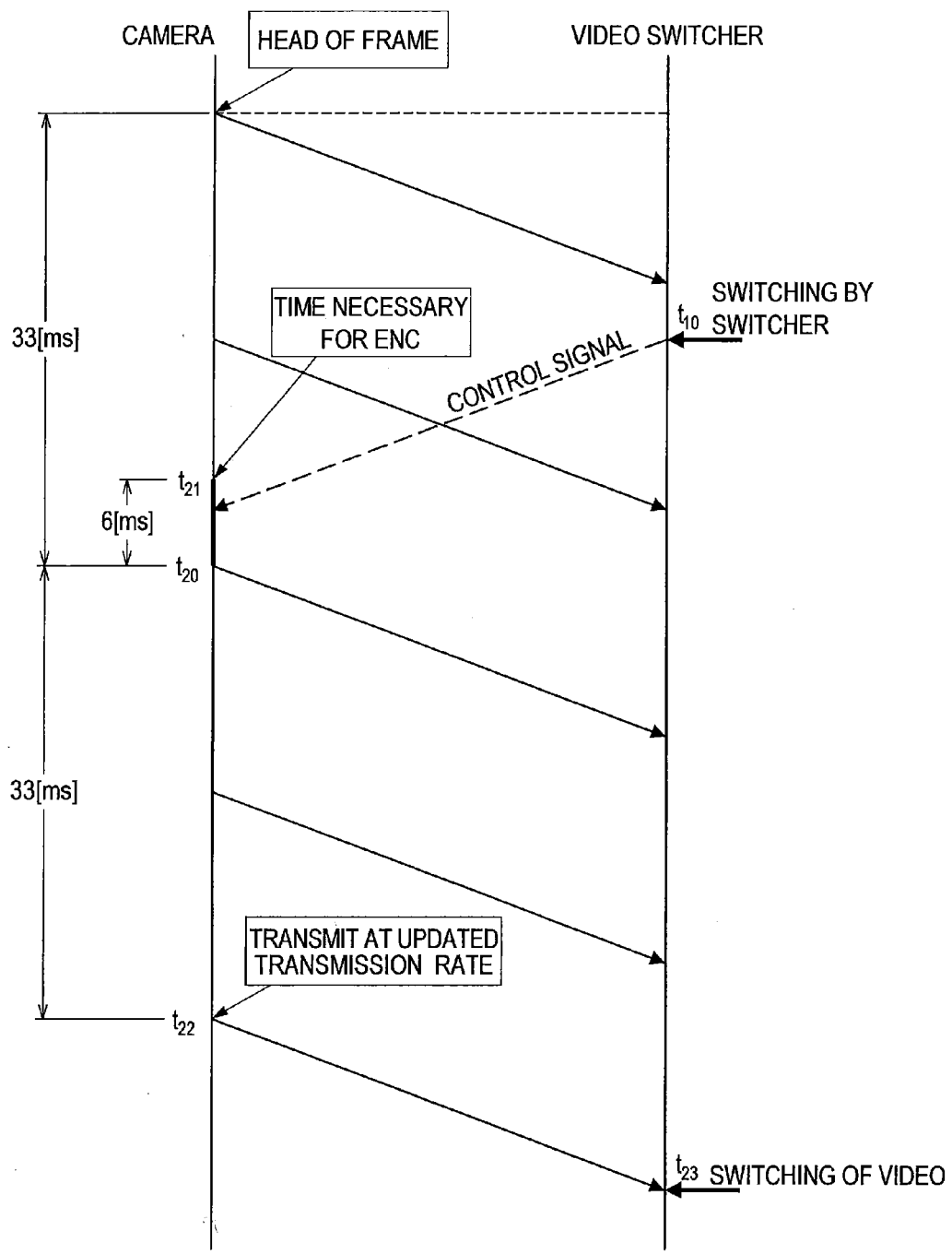
FIG. 5 is a schematic diagram showing a case in which a time of 6 ms is necessary for an encoding process on the camera side, for example.

Further, as a video encoding process is performed on the camera side for a predetermined period of time, the encoding time should be taken into consideration when video switching is performed. Specifically, the camera 200 side needs a time of several ms to several ten ms to perform an encoding process on an image captured with an image sensor (imager). FIG. 5 shows an example in which a time of 6 ms is needed for an encoding process on the camera 200 side. At the camera 200, an encoding process is performed on a video input from the imager at time t21 that is earlier than the actual transmission timing (time t20) of a head of a frame by 6 ms. Upon termination of the encoding process (time t20) after 6 ms, a video signal starts to be output as a head of a frame. Thus, in order to switch the transmission rate, a control signal should arrive at the camera 200 before the start timing (time t21) of the encoding of the frame. When a control signal arrives at the camera 200 before the time t21, it becomes possible for the camera 200 to perform transmission at the updated transmission rate from a head of a frame at the time 20.

Thus, even when the timing at which a transmission rate control signal arrives at the camera 200 is earlier than the transmission timing of a head of a frame (time t20), it is difficult to update the transmission rate from the head of the frame unless the arrival timing is earlier than the time needed for an encoding process (6 ms herein). Therefore, in the example of FIG. 5, the timing at which a video can be transmitted at the updated transmission rate from the camera 200 is the time t22 after one frame. Then, the video switcher 300 can actually switch a video at the time t23 when a frame with the updated transmission rate arrives at.

Depending on an encoding method that uses video interframe prediction, it may be necessary to wait for a period of one frame to change the transmission rate. As described above, depending on the transmission delay, encoding time, encoding method, and the like of each camera 200 connected to the video switcher 300, the timing at which the video switcher 300 actually receives a video signal with the updated transmission rate varies, so that the timing at which the video switcher 300 actually updates the transmission rates varies.

In addition, if the video switch timing is unconditionally switched from the timing (t10 in FIGS. 4 and 5) of the switching operation of the video switcher 300 to a head of a next frame, it is considered that there will be a camera(s) 200 whose switch timing of the transmission rate is slow due to factors such as a delay of the arrival of a control signal, encoding time, and the like. Then, there arises a problem that videos of first several frames transmitted from such camera(s) 200 become low-resolution videos as the transmission rate of such videos is the one before the update.

Meanwhile, it is also conceived that a video is unconditionally switched after several frames (e.g., five frames) from the timing of the switching operation of the video switcher 300 in enough time. However, in this case, a circumstance would arise in which even after the transmission rate is updated on the camera 200 side, the video switcher 300 side does not switch the main camera 200. Thus, it is presumed that videos of several frames immediately before the switching will have low resolution.

Herein, in this embodiment, in a system that controls the transmission rate as described above, a video switcher control method that allows switching of a video at desired timing without degrading the video is implemented.

1-2. Summary of this Embodiment

Figure 6:
FIG. 6 is a schematic diagram showing data (a packet signal) of a video frame.

In this embodiment, a flag (a main camera flag) indicating that the camera is the main camera 200 (a camera selected as a main video) is added to a head of a video frame, and a video is switched when this flag is detected. FIG. 6 is a schematic diagram showing data (an RTP packet) of a video frame. The flag indicating that the camera is the main camera 200 can be added as information to a header such as an RTP header or a picture header. Although not shown in FIG. 6, in the case of a UDP/IP network, an IP header is added to the head of the data in FIG. 6. The flag may also be added to the IP header. Note that the picture header is a header added to a head of a video frame, and is given various names depending on video codec.

1-3. Process Flow of this Embodiment

Figure 7:
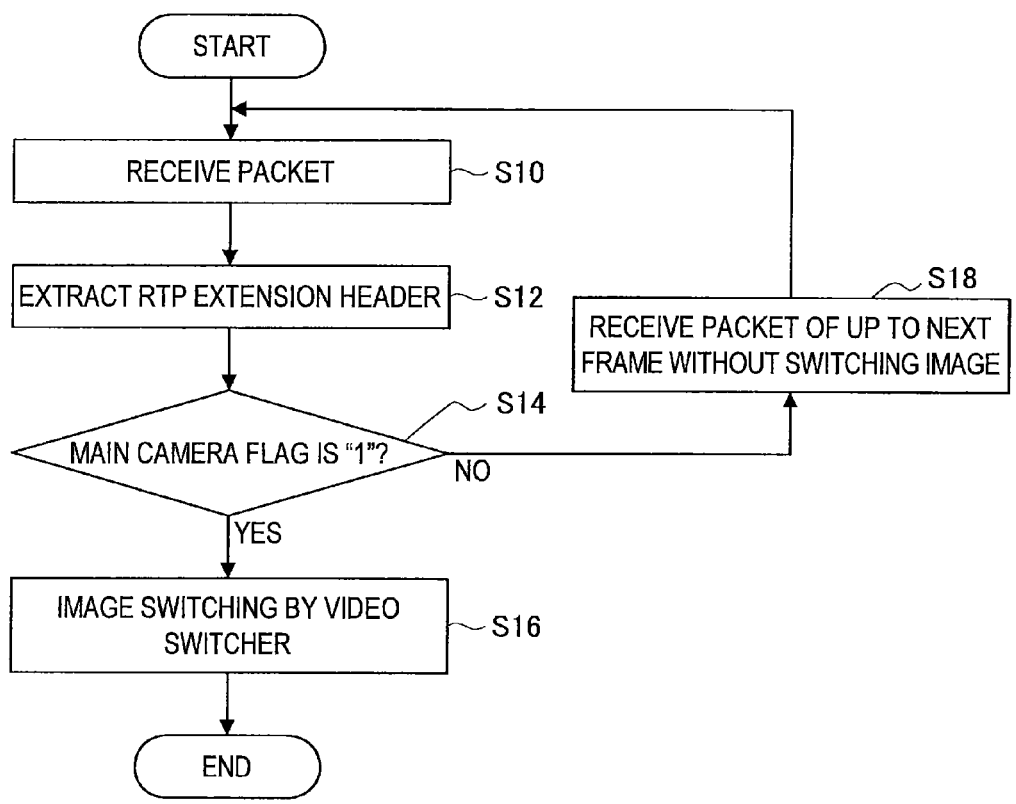
FIG. 7 is a flowchart showing a flow of a process performed on the video switcher side when a flag indicating that the camera is a main camera is added to an RTP header (RTP Extension Header)

FIG. 7 is a flowchart showing a flow of a process performed on the video switcher 300 (the image receiver 600) side when a flag indicating that the camera is the main camera is added to an RTP header (an RTP Extension Header). First, in step S10, the video switcher 300 receives a video packet transmitted from the camera 200. In the next step S12, the RTP Extension Header is extracted, and a main camera flag written at a predetermined position of the RTP Extension Header is read.

In the next step S14, if the main camera flag is "1" is determined. If the main camera flag is determined to be "1," the flow proceeds to step S16. If the flow proceeds to step S16, the packet is determined to be a frame switching head packet as the main camera flag is "1." Thus, a process of switching a video with the video switcher 300 is performed from a video output obtained as a result of decoding the packet.

Meanwhile, if the main camera flag is not determined to be "1" in step S14, the flow proceeds to step S18. In step S18, it is determined that this packet does not need frame switching, and the flow returns to step S10, where a next packet is received.

Although a head position for switching is detected based on a flag of a header of a packet in the aforementioned example, it is also possible to, without using a special flag, constantly monitor a field indicating the transmission rate or the data length of the video packet using the video switcher 300 (the image receiver 310), and switch the image at the changing point of the value (a point in time when the transmission rate has increased or a point in time when the data length has increased). In this case, the image can be switched without using a special flag.

Alternatively, it is also possible to use a configuration in which the head position for switching is not determined from a video packet, but a control packet (an RTCP packet)

other than the video packet is used, so that a video is switched when the video switcher 300 receives the control packet.

Although the aforementioned process can be performed with the video switcher 300, the aforementioned process can also be performed using the image receiver 310 that receives a packet directly from the network switch 500.

1-4. Exemplary Configuration of Image Receiver

Figure 8:
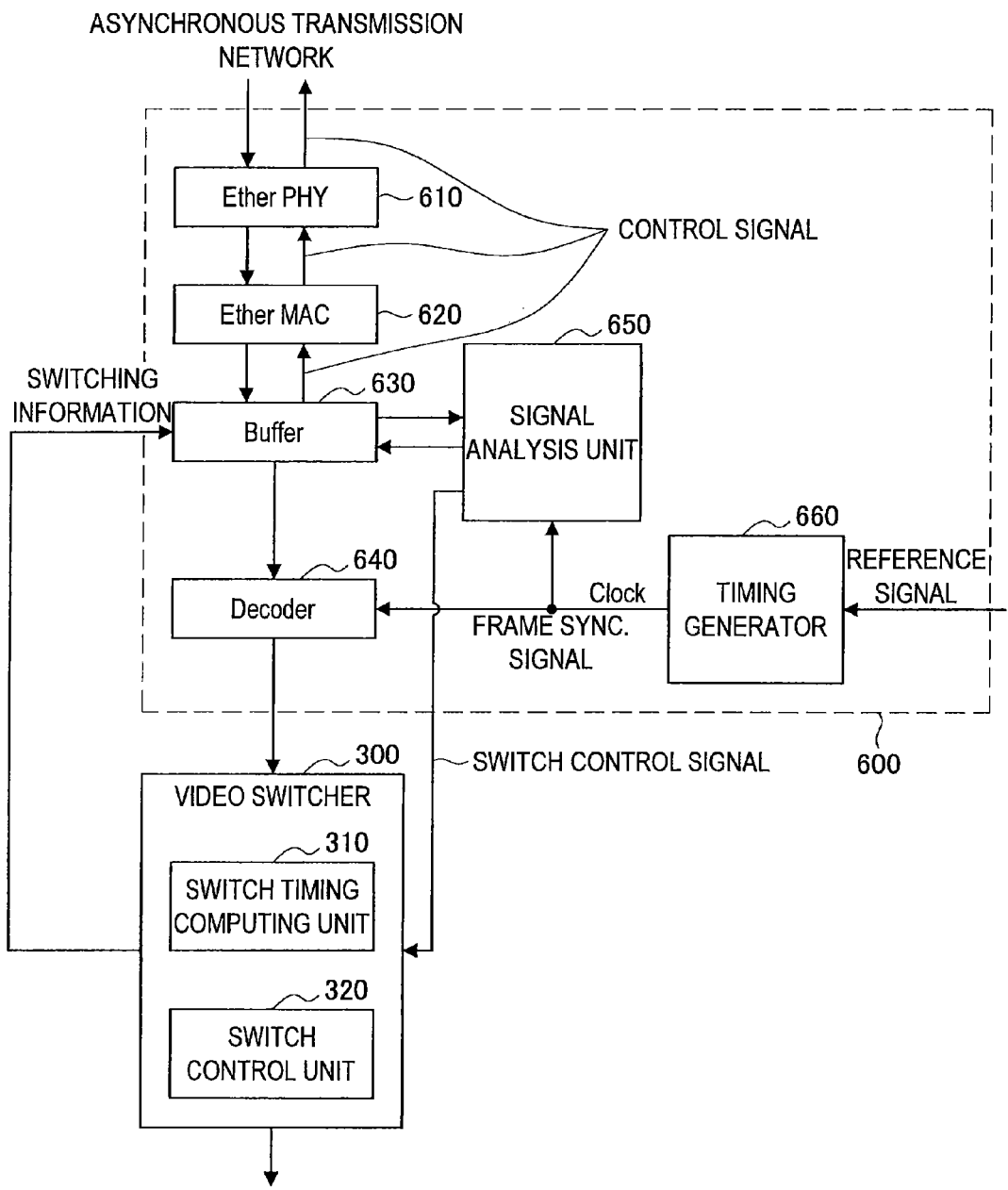
FIG. 8 is a schematic diagram showing the configuration of an image receiver.

FIG. 8 is a schematic diagram showing the configuration of the image receiver 600 for implementing the aforementioned process. Note that the image receiver 600 and the video switcher 300 may be constructed either integrally or separately. The image receiver 600 decodes video data or the like of each camera 200 input from the network switch 500. As shown in FIG. 8, the image receiver 600 includes an Ether PHY 610, an Ether MAC 620, a buffer 630, a decoder 640, a signal analyzing unit 650, and a timing generator 660.

The video switcher includes a switch timing computing unit 310 and a switch control unit 320. In addition, the video switcher includes an input unit (not shown) for receiving an operation of switching the video camera 200 by a user. Based on an operation of switching the camera 200 by a user, a transmission rate control signal is transmitted from the Ether PHY 610 to the camera 200.

Each component shown in FIG. 8 can include a circuit (hardware), or a CPU (Central Processing Unit) and a program (software) for causing the CPU to function. In such a case, the program can be stored in a storage medium such as memory in the camera receiver 600 or an externally connected storage medium.

An A/V packet and a control packet received from a network are input to the buffer 630 for absorbing jitters via the Ether PHY 610 and the Ether MAC 620. The signal analyzing unit 650 extracts and analyzes a main camera flag inserted in a head of a video frame. When the signal analyzing unit 650 extracts the main camera flag inserted in the head of the video frame, the signal analyzing unit 650 transmits a switch control signal to the video switcher 300. The switch control signal includes information that identifies a camera to be a main camera.

The decoder 640 decodes packets such as the A/V packet and the control packet transmitted from the buffer 630. The output of the decoder 640 is transmitted to the video switcher 300.

The video switcher 300, upon receiving a switch control signal from the signal analyzing unit 650, switches a video signal so that the camera 200, which has transmitted a video signal whose main camera flag is "1," becomes a main camera. Accordingly, it becomes possible to, when the main camera flag is "1," determine that the signal is a frame switching head packet, and to switch the video with the video switcher 300 from a video output obtained as a result of decoding the packet.

In addition, the signal analyzing unit 650 constantly monitors a field indicating the transmission rate or the data length of a video packet, and, upon detecting a changing point of the value (a point in time when the transmission rate has increased or a point in time when the data length has increased), transmits a switch control signal to the video switcher 300. Accordingly, it becomes possible to switch an image without using a special flag.

Further, the signal analyzing unit 650, when switching a video using a control packet (an RTCP packet) other than a video packet, transmits a switch timing signal to the video switcher 300 upon receiving the control packet. Accordingly, it becomes possible to switch an image based on the control packet.

1-5. Exemplary Configuration of Camera

Figure 9:
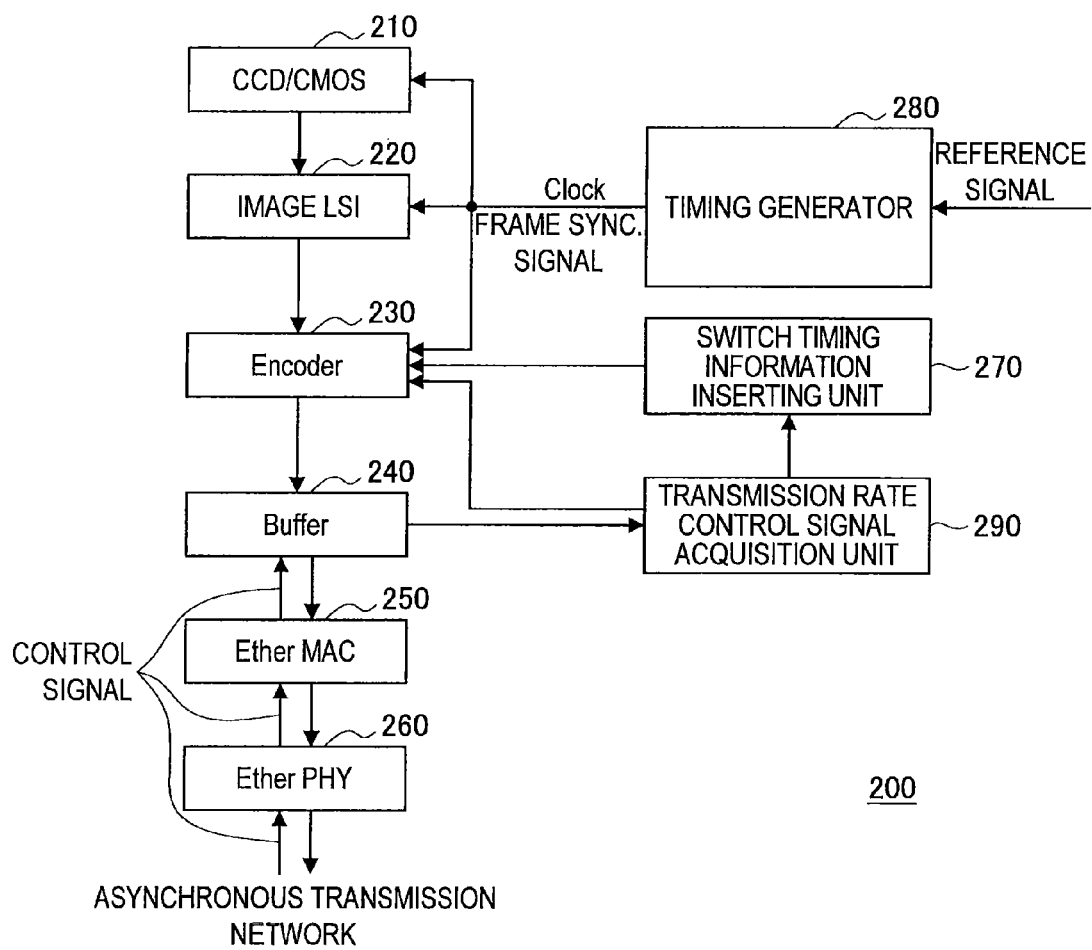
FIG. 9 is a schematic diagram showing the configuration of a camera.

FIG. 9 is a schematic diagram showing an exemplary configuration of the camera 200. As shown in FIG. 9, the camera 200 includes an image sensor 210 such as a CCD or a CMOS, an image LSI 220, an encoder 230, a buffer 240, an Ether MAC 250, an Ether PHY 260, a switch timing information inserting unit 270, a timing generator 280, and a transmission rate control information acquisition unit 290. Each component shown in FIG. 9 can include a circuit (hardware), or a CPU (Central Processing Unit) and a program (software) for causing the CPU to function. In such a case, the program can be stored in a storage medium such as memory in the camera 200 or an externally connected storage medium.

Video data captured with the image sensor 210 is processed with the image LSI 220, and is encoded and packetized with the encoder 230 to have a format adapted to network transmission.

Herein, the operation timing of each of the image sensor 210, the image LSI 220, and the encoder 230 is determined from a frame synchronization signal (Frame Sync.) generated from a reference signal and a clock. This operation timing is generated by the timing generator 280. The timing of a frame synchronization signal in each camera 200 is advanced in accordance with a delay in the transmission channel or a delay in the encoder 230, and can be set at a timing earlier than a frame synchronization signal in the image receiver 600. Accordingly, in the image receiver 600, it is possible to obtain a decoded video synchronized with a frame synchronization signal in the standard signal generator 400 without being influenced by a delay in the transmission channel or a delay in the encoder 230. Note that the camera 200 and the image receiver 600 can operate in synchronization with each other using an identical reference signal.

The transmission rate control information acquisition unit 290 receives transmission rate control information transmitted in accordance with switching of a video on the video switcher 300 side. The encoder 230 controls the compression rate of the video data based on the transmission rate control information. The transmission rate control information can include information indicating that the camera is a main camera.

In addition, the switch timing information insertion unit 270 inserts information indicating that the camera is a main camera into a header of a packet signal of a video based on the transmission rate control information. In the aforementioned example, the switch timing information insertion unit 270 sets a main camera flag "1" on the header of a packet. In addition, in the case of inserting information indicating that the camera is a main camera into a packet using a changing point of a field indicating the transmission rate or the data length of the video packet, the switch timing information insertion unit 270 inserts information indicating the changing point into each field based on the transmission rate control information. Further, when using a control packet (an RTCP packet) other than a video packet, the switch timing information insertion unit 270 inserts the control packet separately from a video packet.

The buffer 240 is provided to absorb (adjust) the time after a packet is output from the encoder 230 till it is input to the Ether MAC 250. A packet signal is, after undergoing a predetermined procedure in the Ether MAC 250, processed with the Ether PHY 260, and transmitted to a network. In the Ether MAC 250, control information such as a transmission destination address is added to a packet, and data is transmitted in units of a MAC frame. The Ether PHY 260 transmits data to the transmission network 500 in accordance with a physical connection/transmission method of the network.

As described above, according to the first embodiment, a main camera is switched based on a received signal, whereby it is possible to surely suppress, when the camera is switched by the video switcher 300, degradation of an image due to a decrease in the transmission rate before and after the switching.

2. Second Embodiment

Next, a second embodiment of the present disclosure will be described. In the second embodiment, a transmission delay is measured, and a timing when the video switcher 300 switches a video is calculated, taking into consideration the transmission delay amount as well as the time necessary for an encoding process on the camera 200 side. Then, the video switcher 300 switches a video at the calculated timing.

Figure 10:
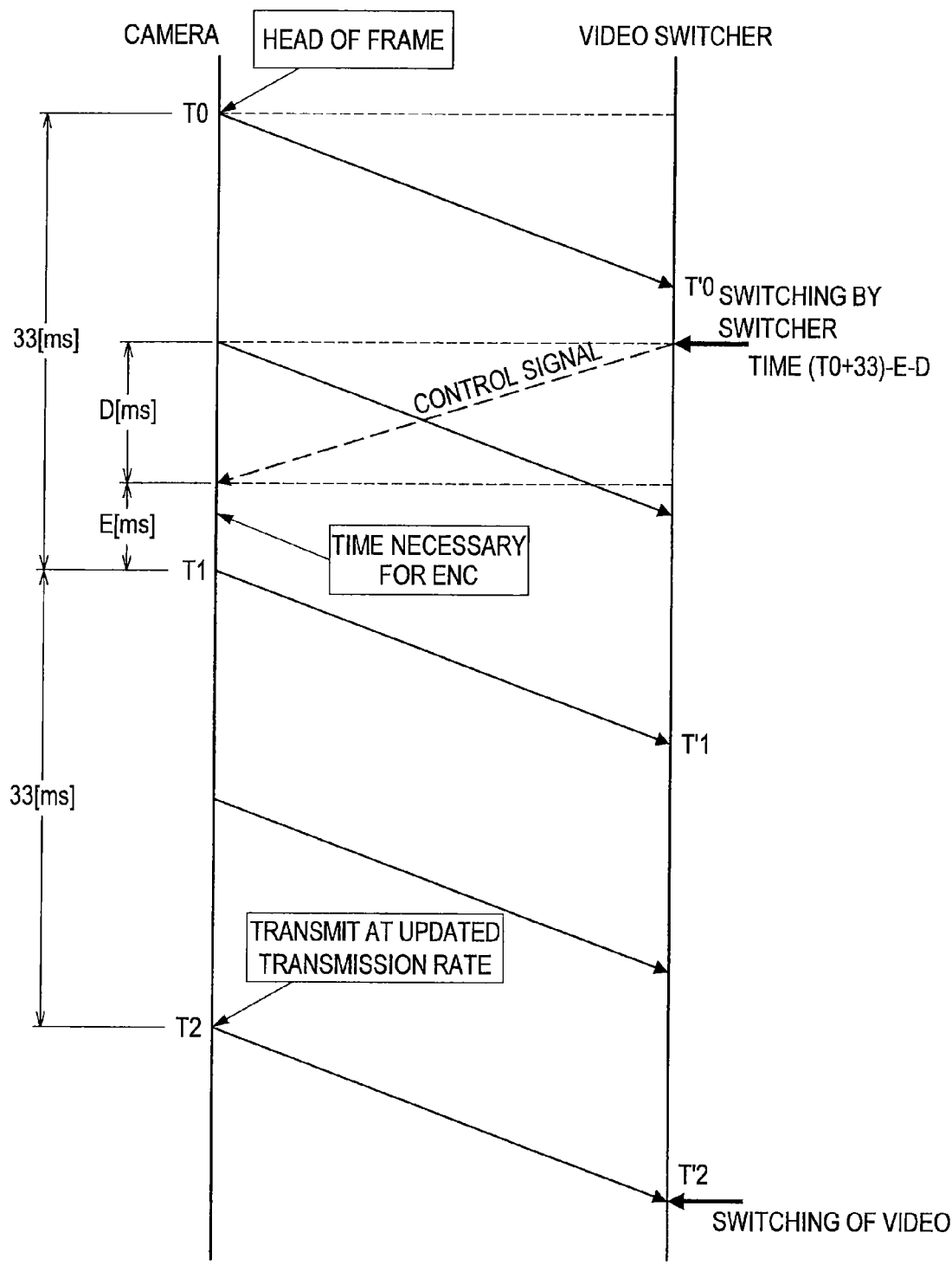
FIG. 10 is a schematic diagram showing a method of calculating the video switch timing in a second embodiment.

FIG. 10 is a schematic diagram showing a method of calculating the video switch timing. As shown in FIG. 10, transmission times of head packets of frames at the camera 200 are indicated by T0, T1, T2 . . . In addition, the reflection time of each frame (the reception time of each frame) at the video switcher 300 is indicated by T'0, T'1, T'2 . . . Further, a transmission delay time of a transmission rate control signal is indicated by D, and an encoding time in the camera 200 is indicated by E.

As shown in FIG. 10, provided that a period of a frame is 33 ms, the time T1 is T0+33 [ms]. When a switching operation of the video switcher 300 is performed at a timing later than the time (T0+33)−E−D obtained by subtracting the transmission delay time D and the encoding time E from the time T1, a transmission rate control signal is transmitted from the video switcher 300 at a timing later than the time (T0+33)−E−D. In this case, a packet that arrives at the video switcher 300 at the time T'1 is encoded before a control signal arrives at the camera 200. Thus, control is performed so that the actual video is not switched at the time T'1, but the actual video is switched at the time T'2.

Meanwhile, when a switching operation of the video switcher 300 is performed at a timing earlier than the time (T0+33)−E−D, control is performed so that the actual video is switched at the time T'1. A packet that arrives at the time T'1 is encoded after a control signal arrives at the camera 200. Thus, a process such as changing the transmission rate or the like is performed on the camera 200 side. In this case, control is performed so that the actual video is switched at the time T'1.

Therefore, as shown in FIG. 8, the video switcher 300 includes the switch timing computing unit 310 and the switch control unit 320. The switch timing computing unit 310 computes the actual switch timing of a video based on the time when a video switching operation is input, the transmission delay time D, the encoding time E, and the like. The switch timing control unit 320 switches the actual video based on the timing computed by the switch timing computing unit 310.

More specifically, when the time T of the switching operation timing of the video switcher 300 satisfies the following Formula (1), the actual video switch timing becomes the time T'1.

$$(T0+33)-E-D \leq T < (T1+33)-E-D \qquad (1)$$

Likewise, when the time of the switching operation timing of the video switcher 300 satisfies the following Formula (2), the actual video switch timing becomes the time T'2.

$$(T1+33)-E-D \leq T < (T2+33)-E-D \qquad (2)$$

Note that the aforementioned example is a case in which the period of one frame is 33 ms, which is an exemplary case in which an encoding process is necessary. In addition, the aforementioned example is based on the following conditions: the camera 200 and the video switcher 300 operate at a synchronized timing, and the video switcher 300 can know the transmission times T0, T1, T2 . . . of frame packets.

As described above, according to the second embodiment, a video switch timing on the video switcher 300 side can be controlled in accordance with the transmission delay time D, the encoding time E, and the like of a transmission rate control signal. Thus, it is possible to switch a video at an optimum timing, and allow a video to be viewed at a desired transmission rate.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) A transmitting device comprising:
    a packet signal generation unit configured to generate a packet signal of a video;
    a transmitting unit configured to transmit the packet signal via an asynchronous transmission network used in common by another transmitting device; and
    a compression rate control unit configured to control a video compression rate, wherein
    switch timing information indicating a switch timing of the video compression rate is transmitted together with the packet signal of the video.

(2) The transmitting device according to (1), further comprising a switch timing information insertion unit configured to insert switch timing information indicating a switch timing of the video compression rate into the packet signal.

(3) The transmitting device according to (2), wherein the switch timing information insertion unit inserts as the switch timing information a special flag into a header of the packet signal.

(4) The transmitting device according to (2), wherein the switch timing information insertion unit inserts timing information as the switch timing information, using transmission rate information described in a header of the packet signal.

(5) The transmitting device according to (2), wherein the switch timing information insertion unit inserts timing information as the switch timing information, using a data length described in a header of the packet signal.

(6) The transmitting device according to (1), wherein an RTP packet is used as a packet of the packet signal.

(7) The transmitting device according to (1), wherein an RTCP packet is used as a packet of the packet signal.

(8) A receiving system comprising:
    a receiving unit configured to receive packet signals of videos from a plurality of cameras via an asynchronous transmission network;

a switch timing acquisition unit configured to acquire switch timing information of a video compression rate included in each packet signal; and a switch control unit configured to switch between the videos of the plurality of cameras in accordance with the switch timing information.

(9) The receiving system according to (8), wherein the switch timing information is a special flag inserted into a header of each packet signal.

(10) The receiving system according to (8), wherein the switch timing information is transmission rate information described in a header of each packet signal.

(11) The receiving system according to claim (8), wherein the switch timing information is data length information described in a header of each packet signal.

(12) A communication system comprising a plurality of transmitting devices and a receiving system,
    wherein each transmitting device includes
        a packet signal generation unit configured to generate a packet signal of a video,
        a transmitting unit configured to transmit the packet signal via an asynchronous transmission network used in common by another transmitting device, and
        a compression rate control unit configured to control a video compression rate,
    wherein switch timing information indicating a switch timing of the video compression rate is transmitted together with the packet signal of the video, and
    wherein the receiving system includes
        a receiving unit configured to receive packet signals of videos from the plurality of transmitting devices via the asynchronous transmission network,
        a switch timing acquisition unit configured to acquire the switch timing information included in each packet signal, and
        a switch control unit configured to switch between the videos of the plurality of transmitting devices in accordance with the switch timing information.

(13) A transmission method comprising:
    generating a packet signal of a video;
    transmitting the packet signal via an asynchronous transmission network used in common by another transmitting device;
    controlling a video compression rate; and
    inserting switch timing information indicating a switch timing of the video compression rate into the packet signal.

(14) A program for causing a computer to function as:
    means for generating a packet signal of a video;
    means for transmitting the packet signal via an asynchronous transmission network used in common by another transmitting device;
    means for controlling a video compression rate, and
    inserting switch timing information indicating a switch timing of the video compression rate into the packet signal.

(15) A receiving method comprising:
    receiving packet signals of videos from a plurality of cameras via an asynchronous transmission network;
    acquiring switch timing information of a video compression rate included in each packet signal; and
    switching between the videos of the plurality of cameras in accordance with the switch timing information.

(16) A program for causing a computer to function as:
    means for receiving packet signals of videos from a plurality of cameras via an asynchronous transmission network;
    means for acquiring switch timing information of a video compression rate included in each packet signal; and
    means for switching between the videos of the plurality of cameras in accordance with the switch timing information.

(17) A receiving system comprising:
    a receiving unit configured to receive packet signals of videos from a plurality of cameras via an asynchronous transmission network;
    a control signal transmitting unit configured to transmit a control signal for a video compression rate;
    a switch timing computing unit configured to compute a switch timing of the video compression rate based on a predetermined parameter including at least a delay time of the asynchronous transmission network; and
    a switch control unit configured to switch between the videos of the plurality of cameras based on the switch timing.

(18) The receiving system according to claim 17, wherein the switch timing computation unit computes the switch timing based on the delay time and a video encoding time in the transmitting device.

(19) A receiving method comprising:
    receiving packet signals of videos from a plurality of cameras via an asynchronous transmission network;
    transmitting a control signal for a video compression rate;
    computing a switch timing of the video compression rate based on a predetermined parameter including at least a delay time of the asynchronous transmission network; and
    switching between the videos of the plurality of cameras based on the switch timing information.

(20) A program for causing a computer to function as:
    means for receiving packet signals of videos from a plurality of cameras via an asynchronous transmission network;
    means for transmitting a control signal for a video compression rate;
    means for computing a switch timing of the video compression rate based on a predetermined parameter including at least a delay time of the asynchronous transmission network; and
    means for switching between the videos of the plurality of cameras based on the switch timing information.

The present disclosure contains subject matter related to that disclosed in Japanese Priority Patent Application JP 2011-159120 filed in the Japan Patent Office on Jul. 20, 2011, the entire content of which is hereby incorporated by reference.

What is claimed is:
1. A transmitting device, comprising:
    circuitry configured to:
        generate a packet signal of a video signal;
        receive a switching instruction from a receiving system;
        transmit the packet signal of the video signal to the receiving system via an asynchronous transmission network used in common by another transmitting device; and
        control a video transmission rate and a compression rate of the video signal,
        wherein the receiving system calculates an actual switch timing based on a time of receipt of the switching instruction, wherein the receiving system switches from the video signal of the transmitting device to a video signal of the other transmitting device at the calculated actual switch timing, wherein the actual switch timing is calculated based on the time of receipt of the switching instruction, a period of one frame, a transmission delay time and an encoding time, and wherein the video transmission rate is changed after lapse of the transmission delay time and the encoding time from the time of receipt of the switching instruction.

2. The transmitting device according to claim 1, wherein the circuitry is further configured to insert switch timing information that indicates a switch timing of the video transmission rate into the packet signal.

3. The transmitting device according to claim 2, wherein the circuitry is further configured to insert a flag into a header of the packet signal, wherein the flag is representative of the switch timing information.

4. The transmitting device according to claim 2, wherein the circuitry is further configured to insert timing information as the switch timing information, based on transmission rate information described in a header of the packet signal.

5. The transmitting device according to claim 2, wherein the circuitry is further configured to insert timing information as the switch timing information, based on a data length described in a header of the packet signal.

6. The transmitting device according to claim 2, wherein the switch timing information is data length information of the packet signal, and wherein the receiving system is configured to switch from the video signal of the transmitting device to the video signal of the other transmitting device based on a detection of a change in the data length information of the packet signal.

7. The transmitting device according to claim 1, wherein an RTP packet is used as a packet of the packet signal.

8. The transmitting device according to claim 1, wherein an RTCP packet is used as a packet of the packet signal.

9. The transmitting device according to claim 1, wherein the video transmission rate of the video signal of the transmitting device, based on configuration of the receiving system to switch to the video signal of the transmitting device, is higher than the video transmission rate of a video signal of the other transmitting device of a plurality of transmitting devices that transmit the packet signal to the receiving system via the asynchronous transmission network based on configuration of the receiving system to switch to the video signal of the transmitting device.

10. The transmitting device according to claim 1, wherein the circuitry is further configured to transmit to the receiving system, switch timing information with the packet signal of the video signal, wherein the switch timing information indicates a switch timing of a data length of the packet signal of the video signal.

11. The transmitting device according to claim 1, wherein the compression rate is controlled based on a transmission rate control signal received from the receiving system, and wherein the video transmission rate is switched based on receipt of the transmission rate control signal before the packet signal is encoded.

12. A receiving system, comprising:
circuitry configured to:
  receive packet signals of video signals from a plurality of cameras via an asynchronous transmission network;
  transmit a transmission rate control signal to the plurality of cameras, wherein a compression rate of a received video signal is based on the transmitted transmission rate control signal;
  calculate an actual switch timing to switch between the video signals of the plurality of cameras based on a switching instruction; and
  switch between the video signals of the plurality of cameras at the calculated actual switch timing,
  wherein the actual switch timing is calculated based on a timing of the switching instruction, a period of one frame, a transmission delay time and an encoding time.

13. The receiving system according to claim 12, wherein the circuitry is further configured to acquire switch timing information indicative of a switch timing of a video transmission rate of the video signal included in each of the packet signals, and wherein the switch timing information is a flag inserted into a header of each of the packet signals.

14. The receiving system according to claim 12, wherein the circuitry is further configured to acquire switch timing information indicative of a switch timing of a video transmission rate of the video signal included in each of the packet signals, and wherein the switch timing information is transmission rate information described in a header of each of the packet signals.

15. The receiving system according to claim 12, wherein the circuitry is further configured to acquire switch timing information indicative of a switch timing of a video transmission rate of the video signal included in each of the packet signals, and wherein the switch timing information is data length information described in a header of each of the packet signals.

16. A communication system, comprising:
a plurality of transmitting devices and a receiving system, wherein each of the plurality of transmitting devices includes:
  first circuitry configured to:
    generate a packet signal of a video signal;
    receive a switching instruction from the receiving system;
    transmit the packet signal of the video signal to the receiving system via an asynchronous transmission network used in common by the plurality of transmitting devices; and
    control a video transmission rate and a compression rate of the video signal; and
wherein the receiving system includes:
  second circuitry configured to:
    receive packet signals of video signals from the plurality of transmitting devices via the asynchronous transmission network;
    calculate an actual switch timing to switch between the video signals of the plurality of transmitting devices based on the switching instruction; and
    switch between the video signals of the plurality of transmitting devices at the calculated actual switch timing,
    wherein the actual switch timing is calculated based on a timing of the switching instruction, a period of one frame, a transmission delay time and an encoding time.

17. A transmission method, comprising:
in a transmitting device:
- generating a packet signal of a video signal;
- receiving a switching instruction from a receiving system;
- transmitting the packet signal of the video signal to the receiving system via an asynchronous transmission network used in common by another transmitting device; and
- controlling a video transmission rate and a compression rate of the video signal;
- wherein the receiving system calculates an actual switch timing based on a time of receipt of the switching instruction,
- wherein the receiving system switches from the video signal of the transmitting device to a video signal of the other transmitting device at the calculated actual switch timing,
- wherein the actual switch timing is calculated based on the time of receipt of the switching instruction, a period of one frame, a transmission delay time and an encoding time, and
- wherein the video transmission rate is changed after a lapse of the transmission delay time and the encoding time from the time of receipt of the switching instruction.

18. The transmission method according to claim 17, wherein the video transmission rate of the video signal of the transmitting device, based on configuration of the receiving system to switch to the video signal of the transmitting device, is higher than the video transmission rate of the video signal of the other transmitting device of the plurality of transmitting devices that transmit the packet signal to the receiving system via the asynchronous transmission network based on configuration of the receiving system to switch to the video signal of the transmitting device.

19. A non-transitory computer-readable medium having stored thereon, computer-executable instructions for causing a communication system comprising a plurality of transmitting devices and a receiving system to execute operations, the operations comprising:
- generating a packet signal of a video signal;
- receiving a switching instruction from the receiving system;
- transmitting the packet signal of the video signal from a first transmitting device of the plurality of transmitting devices to the receiving system via an asynchronous transmission network used in common by the plurality of transmitting devices; and
- controlling a video transmission rate and a compression rate of the video signal, wherein
- the receiving system calculates an actual switch timing based on a time of receipt of the switching instruction,
- wherein the receiving system switches from a video signal of the first transmitting device to a video signal of the second transmitting device of the plurality of transmitting devices at the calculated actual switch timing,
- wherein the actual switch timing is calculated based on the time of receipt of the switching instruction, a period of one frame, a transmission delay time and an encoding time, and
- wherein the video transmission rate is changed after a lapse of the transmission delay time and the encoding time from the time of receipt of the switching instruction.

20. A receiving method, comprising:
in a receiving system,
- receiving packet signals of video signals from a plurality of cameras via an asynchronous transmission network;
- transmitting a transmission rate control signal to the plurality of cameras, wherein a compression rate of a received video signal is based on the transmitted transmission rate control signal;
- calculating, using circuitry, an actual switch timing to switch between the video signals of the plurality of cameras based on a switching instruction; and
- switching, using the circuitry, between the video signals of the plurality of cameras at the calculated actual switch timing,
- wherein the actual switch timing is calculated based on a timing of the switching instruction, a period of one frame, a transmission delay time and an encoding time.

21. A non-transitory computer-readable medium having stored thereon, computer-executable instructions for causing a communication system comprising a plurality of cameras and a receiving system to execute operations, the operations comprising:
- receiving packet signals of video signals from the plurality of cameras via an asynchronous transmission network;
- transmitting a transmission rate control signal to the plurality of cameras, wherein a compression rate of a received video signal is based on the transmitted transmission rate control signal;
- calculating an actual switch timing to switch between the video signals of the plurality of cameras based on a switching instruction; and
- switching between the video signals of the plurality of cameras at the calculated actual switch timing,
- wherein the actual switch timing is calculated based on a timing of the switching instruction, a period of one frame, a transmission delay time and an encoding time.

* * * * *